(12) United States Patent
Choi et al.

(10) Patent No.: US 8,316,412 B2
(45) Date of Patent: Nov. 20, 2012

(54) APPLICATION EXECUTION METHOD AND APPARATUS

(75) Inventors: Sun-il Choi, Suwon-si (KR); Min-ho Shin, Seoul (KR); Hye-kyung Ko, Incheon Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 601 days.

(21) Appl. No.: 11/951,380

(22) Filed: Dec. 6, 2007

(65) Prior Publication Data

US 2008/0244647 A1    Oct. 2, 2008

(30) Foreign Application Priority Data

Mar. 29, 2007   (KR) .................. 10-2007-0031140

(51) Int. Cl.
*H04N 7/16* (2011.01)
(52) U.S. Cl. ........................................ 725/140
(58) Field of Classification Search .................. 725/140
See application file for complete search history.

(56) References Cited

U.S. PATENT DOCUMENTS

| | | | | |
|---|---|---|---|---|
| 4,648,031 A * | 3/1987 | Jenner | ................... | 714/10 |
| 5,768,539 A * | 6/1998 | Metz et al. | ................... | 709/249 |
| 6,035,304 A * | 3/2000 | Machida et al. | ................... | 1/1 |
| 6,427,238 B1 * | 7/2002 | Goodman et al. | ................... | 725/136 |

FOREIGN PATENT DOCUMENTS

| | | |
|---|---|---|
| EP | 1 515 465 A1 | 3/2005 |
| KR | 10-2006-0056452 A | 5/2006 |
| KR | 10-2006-0082432 A | 7/2006 |
| WO | 01/43425 A1 | 6/2001 |
| WO | 03/025746 A1 | 3/2003 |
| WO | WO 2006/075884 A1 | 7/2006 |

OTHER PUBLICATIONS

"Digital Audio Broadcasting (DAB); Broadcasting website; Part 3: TopNews basic profile specification" European Broadcasting Union, ETSI TS 101 498-3, Oct. 1, 2005, 11 pages.
Communication from the Dutch Patent Office dated Apr. 15, 2011, in Application No. 2001174.
Office Action issued Mar. 19, 2012 by the State Intellectual Property Office of the People's Republic of China in counterpart Chinese Application No. 200810001511.X.
Hearing Notice issued May 8, 2012 by the Indian Patent Office in counterpart Indian Application No. 2501/MUM/2007.
Communication dated Oct. 27, 2011 from the Korean Intellectual Property Office issued in counterpart Korean Application No. 10-2007-0031140.

* cited by examiner

*Primary Examiner* — Dominic D Saltarelli
(74) *Attorney, Agent, or Firm* — Sughrue Mion, PLLC

(57) ABSTRACT

An application program executing a method and an apparatus for improving the speed of executing an application program for a digital television (DTV) are provided. If log information exists for a resource used by an application program, the resource indicated by the log information is requested, and the application program is executed using the resource transmitted as per the request. Accordingly, it is possible to rapidly provide the application program with the resource used by the application program, thereby increasing the speed of executing the application program.

11 Claims, 4 Drawing Sheets

APPLICATION EXECUTION METHOD AND APPARATUS

CROSS-REFERENCE TO RELATED PATENT APPLICATIONS

This application claims priority from Korean Patent Application No. 10-2007-0031140, filed on Mar. 29, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to digital television (DTV), and more particularly, to execution of a DTV application program.

2. Description of the Related Art

A DTV is a TV capable of receiving digital signals rather than analog signals. In its broadest meaning, DTV may be understood as not only a broadcast system that provides services using digital frequency bands, but also various additional services. Since broadcast content is manufactured using digital equipment, the rate of restoring the broadcast content is better when the content is transmitted using digital signals than when the broadcast content is received using analog signals. Therefore, it is possible to provide high-quality images, sound, and additional data services.

A DTV receives digital broadcast signals obtained by multiplexing an audio/video broadcast signal, channel information, program schedule information, an application program, and data such as images and class files, which are required by the application program.

In this case, the application program can be executed in the DTV and is also referred to as an "Xlet". Representative examples of an Xlet application program include news, traffic information, weather information, stock information, games, and so on. If bi-directional communication can be established, the Xlet may provide various shopping mall transactions, bank services, or stock exchanges (which are commonly referred to as "T-commerce"), as well as on-line game services, messenger services, electronic mail services, etc. However, a large part of application programs, and images and class files requested by each application program are transmitted using a carousel method.

The term "carousel" literally means continuously repeating in a circular course. Since data such as a file is delivered in a single direction, the same data must be repeatedly transmitted for reliable transmission. Therefore, in general, the carousel method is used to transmit a file. The carousel method may be performed in the same way that a disc is used. However, since data is repeatedly transmitted according to the carousel method, if a desired file is not downloaded to a cache of a memory of a DTV, an application program must wait for the file to be transmitted in order to read it, thus causing high latency.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for executing an application program, which are capable of improving the speed of executing the application program by downloading a resource that was used by the application program to a cache of a memory so that the resource can be rapidly provided to the application program.

The present invention also provides a computer readable medium having recorded thereon a computer program for executing the above method.

According to an aspect of the present invention, there is provided a method of executing an application program, the method comprising: determining whether log information exists for a resource used by an application program; requesting the resource indicated by the log information, based on the determination, and executing the application program using the requested resource.

According to another aspect of the present invention, there is provided a computer readable medium having recorded thereon a computer program for executing the above method.

According to another aspect of the present invention, there is provided an apparatus for executing an application program, the apparatus comprising: a log information determining unit determining whether log information exists for a resource used by an application program; a resource request unit requesting the resource indicated by the log information based on the determination; and an application program executing unit executing the application program using the requested resource.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
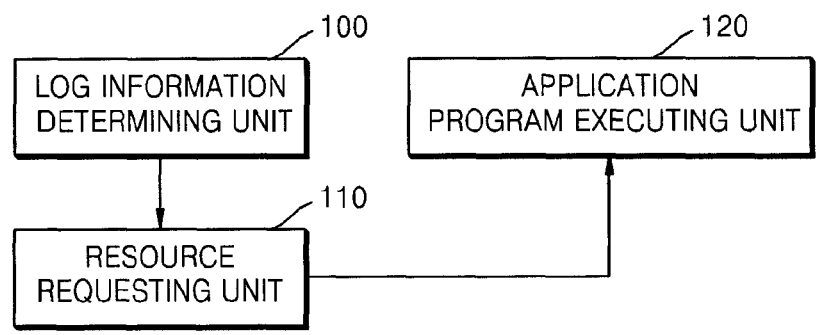
FIG. 1 is a block diagram of an apparatus for executing an application program according to an exemplary embodiment of the present invention.

FIG. 1 is a block diagram of an apparatus for executing an application program according to an exemplary embodiment of the present invention. Referring to FIG. 1, the apparatus includes a log information determining unit 100, a resource requesting unit 110, and an application program executing unit 120.

If a command to execute an application program is input to the log information determining unit 100, the log information determining unit 100 determines whether log information exists for a resource that the application program used.

The command may be input by a user in order to execute a desired application program, or may be automatically generated and input so as to execute an application program matching a new channel when the user changes channels. Then, if the command is input to the log information determining unit 100, the log information determining unit 100 determines whether log information exists for a resource used by the application program that is to be executed.

The resource requesting unit 110 requests the resource represented by the log information, based on the determination of the log information determining unit 100. That is, if it is determined that the log information exists, the resource used by the application program is requested based on the log information. In this case, the resource may be various data, such as images and class files, which is available to the application program, and the log information may include information such as the number of times or the latest time that the resource was requested.

The application program executing unit 120 executes the application program using the resource transmitted in response to the request from the resource requesting unit 110.

Figure 2:
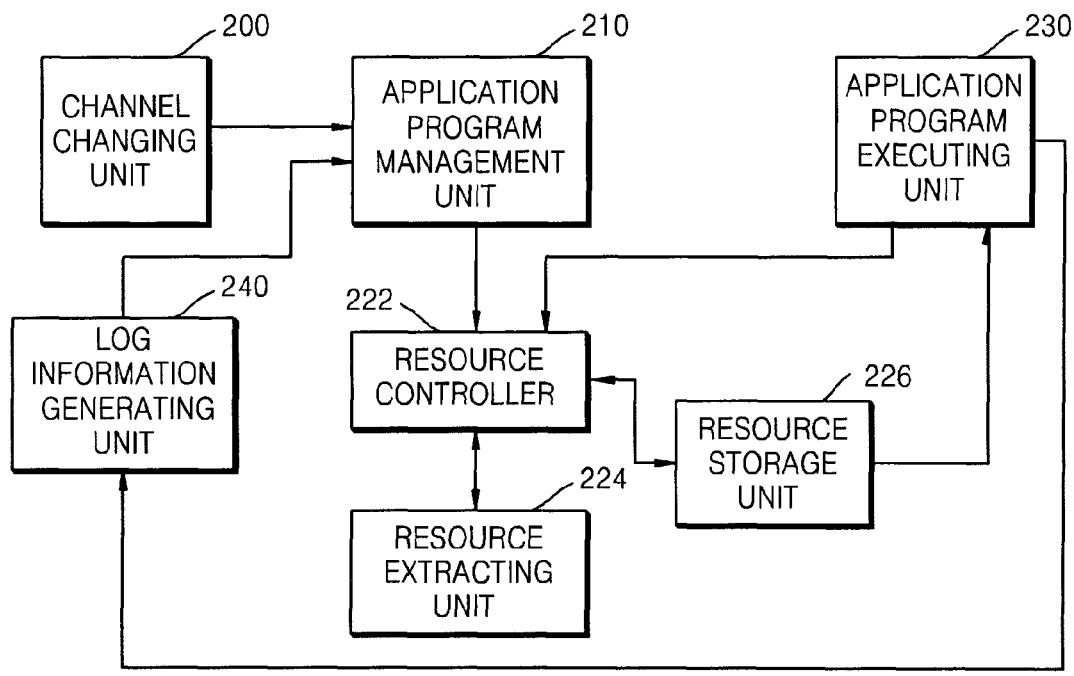
FIG. 2 is a block diagram of an apparatus for executing an application program according to another exemplary embodiment of the present invention.

FIG. 2 is a block diagram of an apparatus for executing an application program according to another exemplary embodiment of the present invention. Referring to FIG. 2, the apparatus includes a channel changing unit 200, an application program management unit 210, a resource controller 222, a resource extracting unit 224, a resource storage unit 226, an application program executing unit 230, and a log information generating unit 240.

If DTV channels are changed, the channel changing unit 200 recognizes this change, and transmits to the application program management unit 210 a command to execute an application program matching the new DTV channel.

The application program management unit 210 receives the command from the channel changing unit 200, determines whether log information exists for a resource that the application program used, and requests the resource controller 222 to provide the resource indicated by the log information when it is determined that the log information exists. The resource may be various data, such as images and class files, which is available to the application program, and the log information may include information such as the number of times or the latest time that the resource was requested. In this case, if the number of times the application program executing unit 230 requested the resource is equal to or greater than a predetermined number, the application program management unit 210 is then allowed to request the resource, so that only resources used frequently by the application program are stored in the resource storage unit 226.

If the application program management unit 210 requests the resource, the resource controller 222 determines whether the requested resource is stored in the resource storage unit 226. If it is determined that the resource is not stored in the resource storage unit 226, the resource extracting unit 224 extracts the resource from among various data received by the DTV, and the resource storage unit 226 stores the extracted resource. In this case, the resource storage unit 226 may be a cache.

If the application program executing unit 230 requests the resource, the resource controller 222 determines whether the resource is stored in the resource storage unit 226. If it is determined that the resource is not stored, the resource extracting unit 224 extracts it from among the various data received by the DTV and the resource storage unit 226 stores the extracted resource. Then, the resource controller 222 provides the stored resource to the application program executing unit 230. If it is determined that the resource is stored, the resource controller 222 provides the stored resource to the application program executing unit 230.

The application program executing unit 230 requests the resource controller 222 to provide the resource needed to execute the application program, receives the resource from the resource controller 222, and executes the application program using the resource.

When the application program executing unit 230 requests the resource, the log information generating unit 240 generates log information for the resource. The log information is used for the application program management unit 210 to find resources used by the application program.

Figure 3:
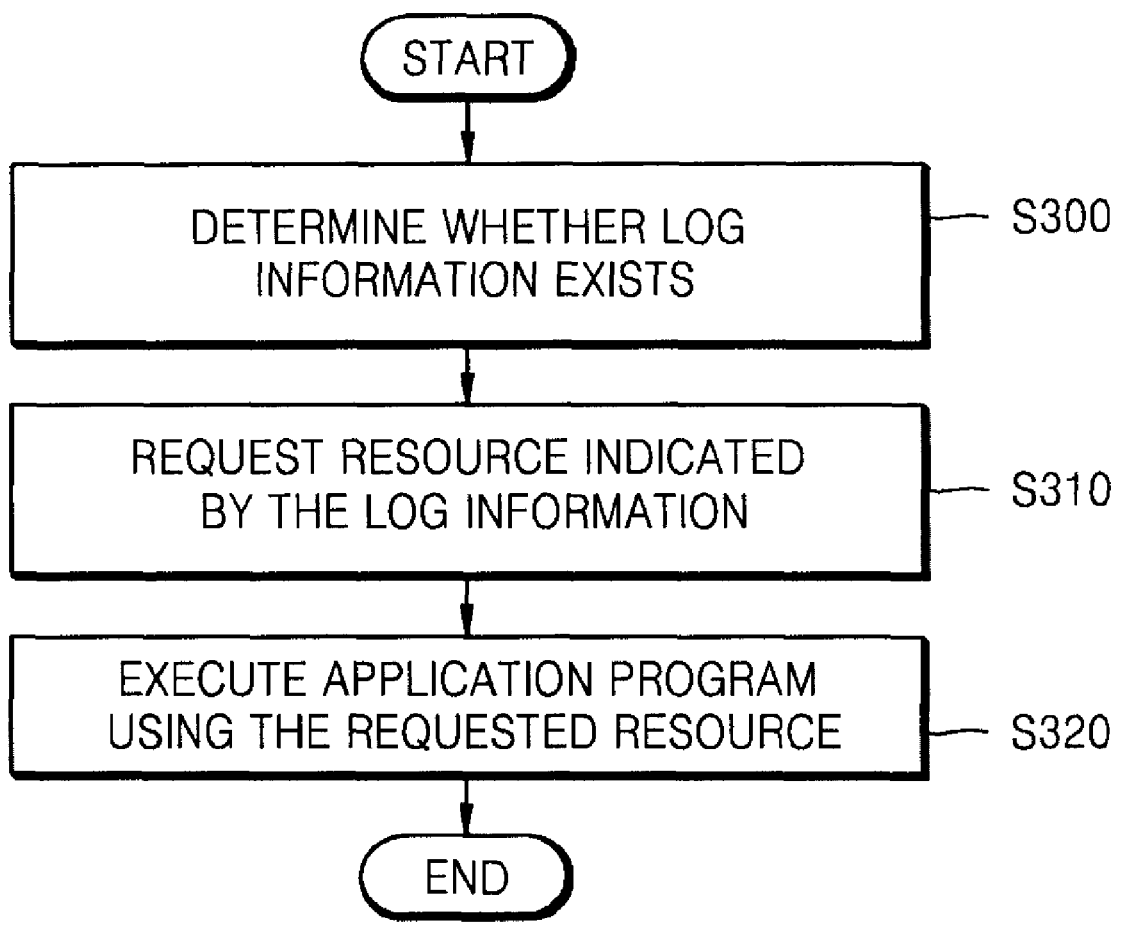
FIG. 3 is a flowchart illustrating a method of executing an application program according to an exemplary embodiment of the present invention.

FIG. 3 is a flowchart illustrating a method of executing an application program according to an exemplary embodiment of the present invention. Referring to FIG. 3, in operation S300, if a command to execute an application program is input to an apparatus that executes an application program, and the apparatus determines whether log information exists for a resource used by the application program. The command may be input by a user in order to execute a desired application program, or be automatically generated and input so as to execute an application program matching a new channel when the user changes channels.

If the command is input, the apparatus determines whether log information exists for the resource used by the application program that is to be executed.

In operation S310, the apparatus requests the resource indicated by the log information based on the determination made in operation S300. If it is determined in operation S300 that the log information exists, the apparatus requests the resource used by the application program based on the log information. The resource may be various data, such as images and class files, which is available to the application program, and the log information may include information such as the number of times or the latest time that the resource was requested.

In operation S320, the apparatus executes the application program using the resource requested in operation S310.

Figure 4A:
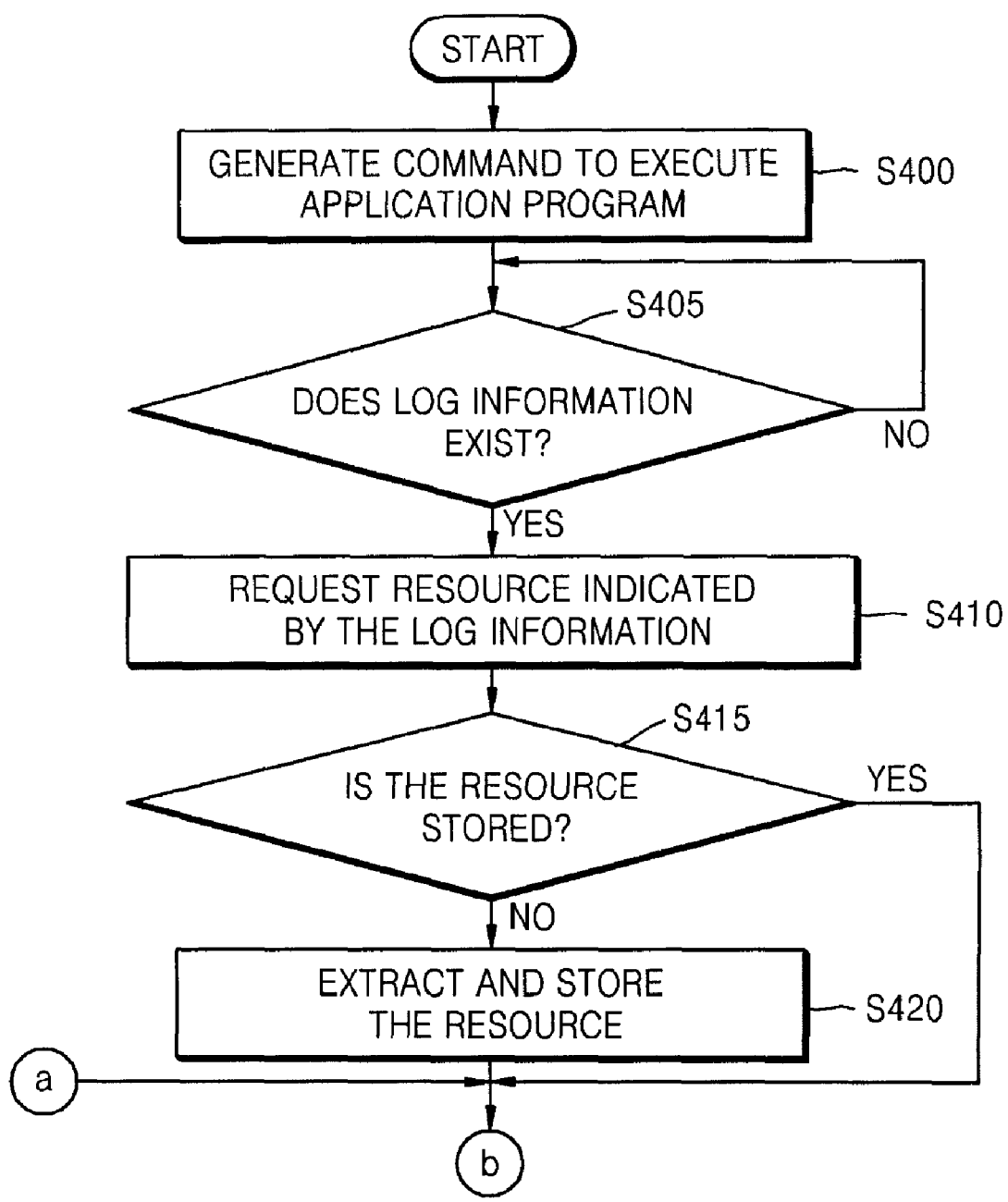
FIGS. 4A and 4B are flowcharts illustrating a method of executing an application program according to another exemplary embodiment of the present invention.
Figure 4B:
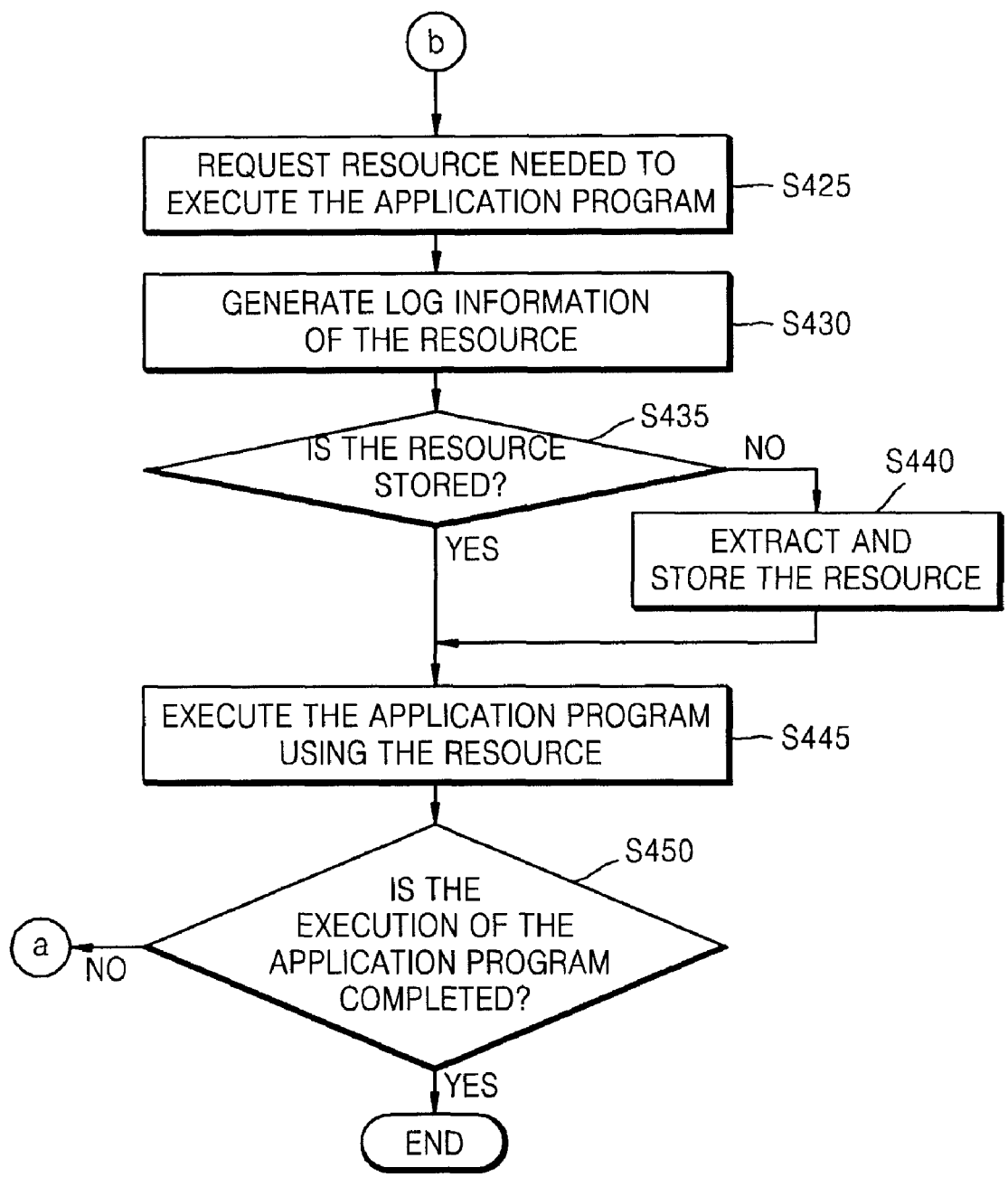

FIGS. 4A and 4B are flowcharts illustrating a method of executing an application program according to another exemplary embodiment of the present invention.

Referring to FIG. 4A, in operation S400, when DTV channels are changed, an apparatus that executes an application program recognizes this change and generates a command to execute an application program matching the new channel.

In operation S405, the apparatus determines whether log information exists for a resource used by the application program. The resource may be various data, such as images and class files, which is available to the application program, and the log information may include information such as the number of times or the latest time that the resource was requested.

If it is determined in operation S405 that the log information exists, the apparatus requests the resource indicated by the log information in operation S410.

In operation S415, the apparatus determines whether the resource indicated in operation S410 is stored.

If it is determined in operation S415 that the resource is not stored, the apparatus extracts the resource from among various data received by the DTV and stores it in operation S420. In this case, the resource may be stored in a cache.

Referring to FIG. 4B, in operation S425, the apparatus requests a resource needed to execute the application program. For example, if a user selects a specific icon or menu using a remote controller or a keyboard during execution of the application program, the apparatus requests text files, image files, or class files corresponding to the specific icon or menu.

In operation S430, the apparatus generates log information of the resource requested in operation S425. The log information is used for the application program to find out resources used by the application program.

In operation S435, the apparatus determines whether the resource requested in operation S425 is stored.

If it is determined in operation S435 that the resource is not stored, the apparatus extracts the resource from among various data received by the DTV, and stores it in operation S440.

In operation S445, the apparatus executes the application program using the stored resource.

In operation S450, the apparatus determines whether the execution of the application program is completed, and proceeds to operation S425 if it is determined that the execution of the application program is not completed.

The present invention can be embodied as computer readable code in a computer readable medium. The computer readable medium may be any recording apparatus capable of storing data that is read by a computer system, e.g. a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the exemplary embodiments of the present invention may be stored and implemented as computer readable code in the distributed system.

As described above, in a method and apparatus for executing an application program according to the exemplary embodiments of the present invention, if log information exists for a resource used by an application program, the resource indicated by the log information is requested, and the application program may be executed using the resource. Accordingly, it is possible to rapidly provide the application program with resources used by the application program resource, thereby increasing the speed of executing the application program.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of executing an application program, the method comprising:
   determining whether log information exists, wherein the log information is recording information on a resource usage by the application program;
   requesting the resource that the application program used based on the log information if it is determined that the log information exists;
   determining whether the resource is stored;
   storing the resource if it is determined that the resource is not stored; and
   executing the application program using the resource, wherein the log information comprises a number of times that the resource was previously requested, and the resource is requested when the number of times that the resource was previously requested is equal to or greater than a predetermined threshold.

2. The method of claim 1, wherein the determining whether log information exists for the resource comprises determining whether the log information exists if a command to execute the application program is received.

3. The method of claim 2, wherein the command is a command to execute an application program matching a new channel, which is generated if channels are changed.

4. The method of claim 1, wherein the resource is stored in a cache.

5. The method of claim 1, wherein the resource includes image or class files available to the application program.

6. An apparatus for executing an application program, the apparatus comprising:
   a log information determining unit which determines whether log information exists, wherein the log information is recording information on a resource usage by the application program;
   a resource requesting unit which requests the resource that the application program used based on the log information if the log information determining unit determines that the log information exists;
   a resource controller which determines whether the requested resource is stored;
   a resource extracting unit which extracts the resource based on the determining whether the resource is stored; and
   a resource storage unit which stores the resource which is extracted,
   an application program executing unit which executes the application program using the resource which is stored,
   wherein the log information comprises a number of times that the resource was previously requested, and
   the resource is requested when the number of times that the resource was previously requested is equal to or greater than a predetermined threshold.

7. The apparatus of claim 6, wherein if a command to execute the application program is input to the log information determining unit, the log information determining unit determines whether the log information exists for the resource used by the application program.

8. The apparatus of claim 7, wherein the command is a command to execute an application program matching a new channel, which is generated if channels are changed.

9. The apparatus of claim 6, wherein the resource storage unit stores the extracted resource using a cache.

10. The apparatus of claim 6, wherein the resource includes image or class files available to the application program.

11. A non-transitory computer readable medium having recorded thereon a computer program for executing a method of executing an application program, the method comprising:
   determining whether log information exists, wherein the log information is recording information on a resource usage by the application program;
   requesting the resource that the application program used based on the log information if it is determined that the log information exists;
   determining whether the resource is stored;
   storing the resource if it is determined that the resource is not stored; and
   executing the application program using the resource which is stored,
   wherein the log information comprises a number of times that the resource was previously requested, and
   the resource is requested when the number of times that the resource was previously requested is equal to or greater than a predetermined threshold.

* * * * *